(12) United States Patent
Perianes

(10) Patent No.: US 12,358,454 B2
(45) Date of Patent: Jul. 15, 2025

(54) MOTOR VEHICLE SEAT

(71) Applicant: TESCA PACIFIC, Paris la Defense (FR)

(72) Inventor: Sergio Perianes, Cedex (FR)

( * ) Notice: Subject to any disclaimer, the term of this patent is extended or adjusted under 35 U.S.C. 154(b) by 0 days.

(21) Appl. No.: 18/721,875

(22) PCT Filed: Dec. 20, 2022

(86) PCT No.: PCT/EP2022/087128
§ 371 (c)(1),
(2) Date: Jun. 20, 2024

(87) PCT Pub. No.: WO2023/118235
PCT Pub. Date: Jun. 29, 2023

(65) Prior Publication Data
US 2025/0058731 A1    Feb. 20, 2025

(30) Foreign Application Priority Data

Dec. 20, 2021 (FR) .................................. FR2114021
Jul. 7, 2022 (FR) .................................. FR2206992

(51) Int. Cl.
*B60R 21/207* (2006.01)
*B60N 2/58* (2006.01)
*B60R 21/2165* (2011.01)

(52) U.S. Cl.
CPC ............ *B60R 21/207* (2013.01); *B60N 2/58* (2013.01); *B60R 21/2165* (2013.01)

(58) Field of Classification Search
CPC ................................ B60R 21/207; D04B 1/22
See application file for complete search history.

(56) References Cited

U.S. PATENT DOCUMENTS 5,401,409 A  *  3/1995  Hartmann ............ B01D 39/083
                                                    156/181
5,682,771 A  * 11/1997  Forest ...................... D04B 1/22
                                                     66/198
2009/0315305 A1* 12/2009 Evans ................. B60R 21/2165
                                                    280/730.2

FOREIGN PATENT DOCUMENTS

| CN | 111137193 A | * | 5/2020 | ............... B60N 2/58 |
| CS | 199431 B1 | * | 7/1980 | |
| CS | 223540 B1 | * | 10/1983 | |
| CS | 259141 B1 | * | 10/1988 | |
| DE | 2022023 A1 | * | 3/1972 | |
| EP | 0965494 B1 | * | 9/2004 | |

(Continued)

*Primary Examiner* — Nicole T Verley
(74) *Attorney, Agent, or Firm* — Patshegen IP; Moshe Pinchas

(57) ABSTRACT

The invention relates to a motor vehicle seat (1) comprising a cushion (3) covered by a knitted textile covering (4) and an inflatable bag (5), said cushion being provided with a passage (6) allowing said bag to be deployed outside said covering, said covering being provided with a weakened zone (7) of lesser tear resistance which extends in a rectilinear reference direction between two opposite parts (9a, 9b) of said covering and facing said passage, said parts presenting a mesh consisting of a plurality of rows of structural loops arranged side by side in said reference direction, each of said loops being linked to the loops surrounding it by a plurality of interweavings, said zone resulting from the knitting of the said covering, each of said parts being provided with a thread for blocking its elongation in a direction perpendicular to said reference direction.

5 Claims, 2 Drawing Sheets

(56) References Cited

FOREIGN PATENT DOCUMENTS

Figure 1A:
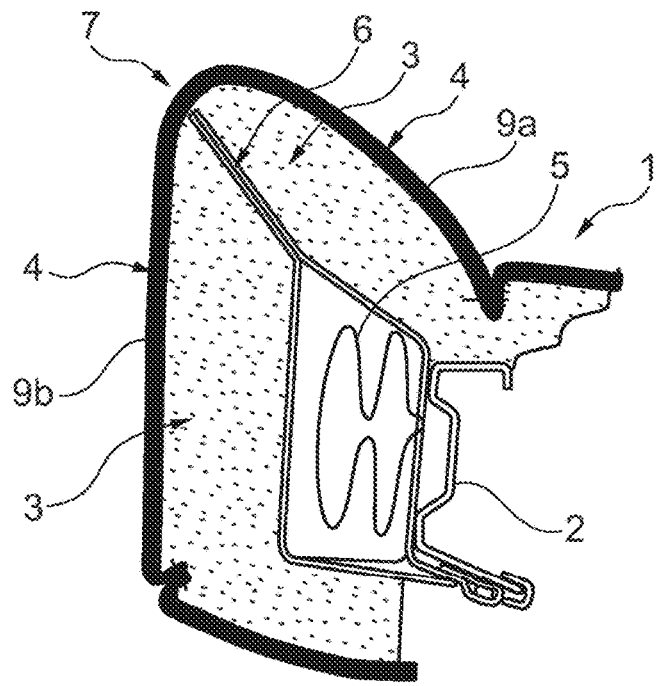

| FR | 3140588 A1 | * | 4/2024 | ........... B60N 2/5833 |
|----|------------|---|--------|-------------------------|
| JP | H1035393 A | * | 2/1988 | |
| JP | 2000212864 A | * | 8/2000 | ........... B60R 21/201 |
| JP | 2003093202 A | * | 4/2003 | |
| JP | 3802584 B2 | * | 7/2006 | |
| JP | 2016214737 A | * | 12/2016 | |
| JP | 2021008223 A | * | 1/2021 | |
| WO | WO-2006055785 A1 | * | 5/2006 | ............. D04B 21/14 |

* cited by examiner

MOTOR VEHICLE SEAT

The invention concerns a motor vehicle seat and a covering for such a seat.

It is known to produce a motor vehicle seat comprising:
- a frame covered with a padding cushion, said cushion being covered with a covering made of knitted textile,
- a protection system secured to said frame, said system comprising an inflatable bag-usually referred to as an airbag—and a device for inflating said bag in an accident situation, knowing that:
- said cushion is provided with a passage allowing said bag to be deployed outside said covering,
- said covering is provided with a weakened zone of lesser tear resistance than the rest of said covering, said zone extending in a rectilinear reference direction between two opposite parts of said covering and facing said passage,
- said parts present a mesh consisting of a plurality of rows of structural loops arranged side by side in said reference direction, each of said loops being linked to the loops surrounding it by a plurality of interweavings.

The presence of such a weakened zone allows the airbag to deploy unhindered by degrading the covering only in the weakened zone, leaving the rest of the covering undamaged.

In a known manner, the weakened zone is created by a seam connecting the opposite parts, said seam being made with a thread having a breaking strength arranged so that it breaks without damaging said parts.

However, this method requires a specific sewing operation to be carried out during the manufacture of the covering, which makes the manufacturing process more complex and the covering more expensive.

In addition, a knitted covering has a high degree of elasticity which can lead to poor deployment of the airbag which interferes with said covering, by producing its ballooning before the weakened zone ruptures, such an effect leading to reduced effectiveness of said airbag.

The aim of the invention is to overcome these drawbacks.

To this end, and according to a first aspect, the invention proposes a motor vehicle seat comprising:
- a frame covered with a padding cushion, said cushion being covered with a covering made of knitted textile,
- a protection system secured to said frame, said system comprising an airbag and a device, not shown, for inflating said airbag in an accident situation, knowing that:
- said cushion is provided with a passage allowing said bag to be deployed outside said covering,
- said covering is provided with a weakened zone of lesser tear resistance than the rest of said covering, said zone extending along a rectilinear reference direction between two opposite parts of said covering and facing said passage,
- said parts present a mesh consisting of a plurality of rows of structural loops arranged side by side in said reference direction, each of said loops being linked to the loops surrounding it by a plurality of interweavings, said zone resulting from the knitting of said covering and each of said parts being provided with a thread for blocking the elongation thereof in a direction perpendicular to said reference direction, said thread:
- having been knitted with said loops during the knitting of said covering,
- extending in zigzags by defining a plurality of rectilinear portions extending in said perpendicular direction and a plurality of portions for connecting said rectilinear portions to each other, said connecting portions extending generally in said reference direction,
- interweaving with said structural loops so as to be integrated into said covering.

The proposed arrangement eliminates the need for manufacturing a seam connecting the opposite parts, as the connection between said parts is made by knitting the covering.

The result is simplified manufacturing and cost savings.

In addition, the presence of the blocking thread prevents the covering from ballooning during airbag deployment, as the airbag is effectively directed towards the weakened zone, which promptly ruptures, allowing the airbag to deploy unhindered.

According to a second aspect, the invention proposes a covering for such a seat.

Further features and advantages of the invention will become apparent from the following description, made with reference to the attached figures, in which:

FIG. 1a and

Figure 1B:
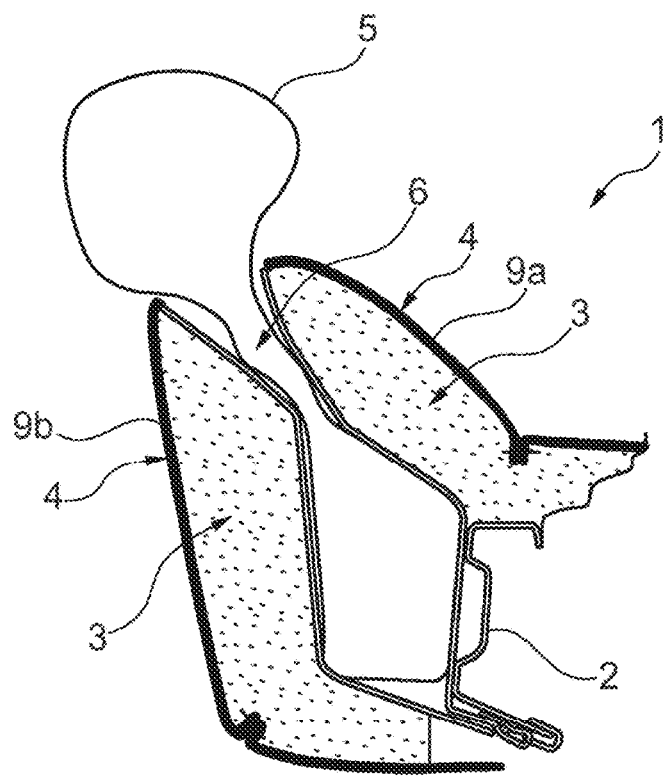
Figure 2:
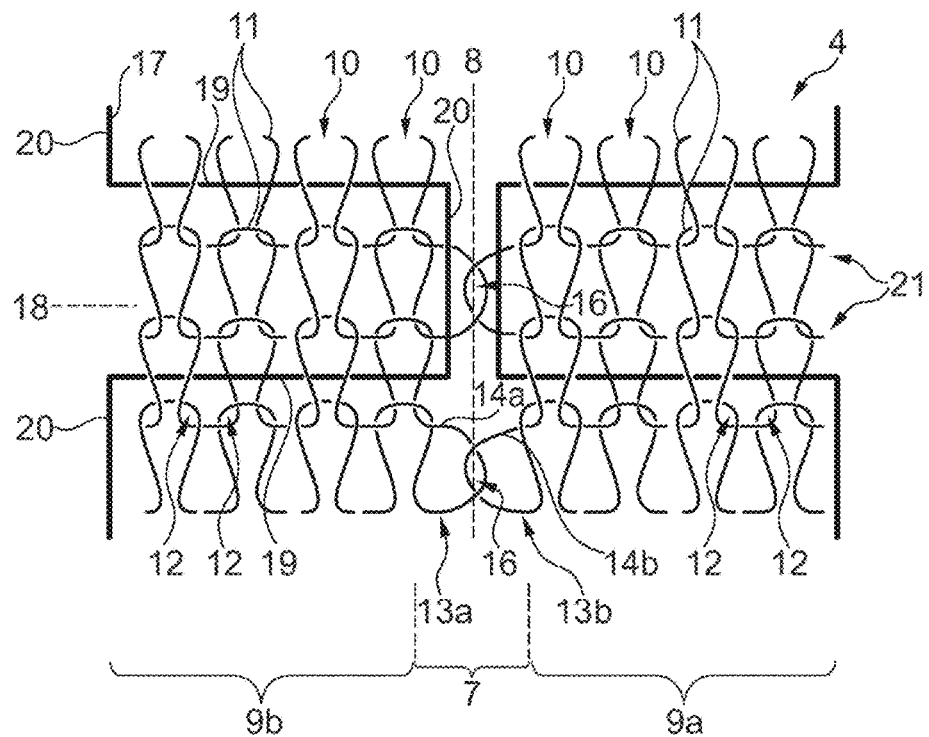
Figure 3:
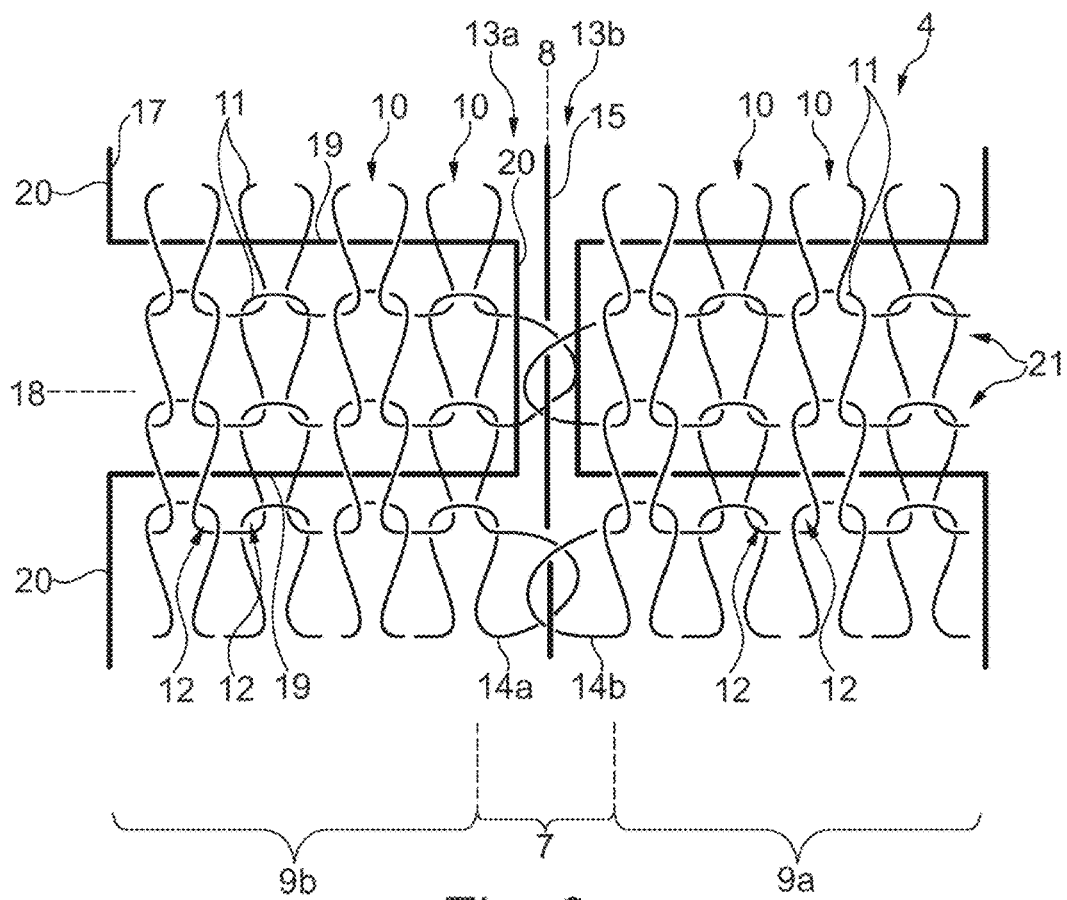

FIG. 1b are schematic partial-section views of a seat in one embodiment, with the airbag undeployed (FIG. 1a) and deployed (FIG. 1b), FIG. 2 is a schematic partial front view of a covering in one embodiment, FIG. 3 is a schematic partial front view of a covering in another embodiment.

With reference to the figures, a motor vehicle seat 1 is described, comprising:
- a frame 2 covered by a padding cushion 3, said cushion being covered by a covering 4 made of knitted textile,
- a protection system secured to said frame, said system comprising an airbag 5 and a device, not shown, for inflating said bag in an accident situation, knowing that:
- said cushion is provided with a passage 6 allowing said bag to be deployed outside said covering,
- said covering is provided with a weakened zone 7 of lesser tear resistance than the rest of said covering, said zone extending in a rectilinear reference direction 8 between two opposite parts 9a, 9b of said covering and facing said passage,
- said parts present a mesh consisting of a plurality of rows 10 of structural loops 11 arranged side by side in said reference direction, each of said loops being linked to the surrounding loops 11 by a plurality of interweavings 12,
- said zone resulting from the knitting of said covering and each of said parts being provided with a thread 17 for blocking its elongation in a direction 18 perpendicular to said reference direction, said thread:
- having been knitted with said loops during the knitting of said covering,
- extending in zigzags by defining a plurality of rectilinear portions 19 extending in said perpendicular direction and a plurality of portions 20 for connecting said rectilinear portions to each other, said connecting portions extending generally in said reference direction,
- interweaving with said structural loops so as to be integrated into said covering.

According to the embodiment shown in FIG. 2, the seat has the following features:
- a boundary row 13a, 13b of connecting loops 14a, 14b results from the knitting of each of the opposite parts 9a, 9b, each of the boundary rows 13a, 13b having, in the reference direction 8, a lower linear density of connecting loops 14a, 14b than the structural loops 11 of either of said parts, the weakened zone 7 is formed by the two boundary rows 13a, 13b that interconnect through a connecting interweaving 16 of each connecting loop 14a of one of said rows 13a with an opposite connecting loop 14b of the other of said rows 13b, so that the connecting loops 14a, 14b are less interweaved than said structural loops.

According to the embodiment shown in FIG. 3, the seat 1 has the following features:

a boundary row 13a, 13b of connecting loops 14a, 14b results from the knitting of each of the opposite parts 9a, 9b, the weakened zone 7 is formed by the boundary rows 13a, 13b where a thread 15, resulting from the knitting of the covering 4, passes alternately through a connecting loop 14a of one of said rows 13a and through an opposite connecting loop 14b of the other of said rows 13b, said thread having a breaking strength arranged so that, under the effect of the deployment of the airbag 5, it breaks without causing a rupture of said connecting loops.

According to the embodiments shown, the rectilinear portions 19 are spaced apart at a regular pitch, two successive rectilinear portions 19 being separated by one or more perpendicular rows 21 of structural loops 11 extending in the perpendicular direction 18.

According to the shown embodiments, two successive rectilinear portions 19 are separated by two perpendicular rows 21 of structural loops 11.

Finally, a covering 4 for such a seat 1 is described, said covering being provided with a weakened zone 7 of lesser resistance to tearing than the rest of said covering, said zone resulting from the knitting of said covering and each of the parts 9a, 9b of said covering being provided with a thread 17 for blocking its elongation in a direction 18 perpendicular to the reference direction 8, said thread:

having been knitted with said loops during the knitting of said covering, extending in zigzags by defining a plurality of rectilinear portions 19 extending in said perpendicular direction and a plurality of portions 20 for connecting said rectilinear portions to each other, said connecting portions extending generally in said reference direction, interweaving with said structural loops so as to be integrated into said covering.

The invention claimed is:

1. Motor vehicle seat (1) comprising:
a frame (2) covered by a padding cushion (3), said cushion being covered by a covering (4) made of knitted textile,
a protection system secured to said frame, said system comprising an airbag (5) and a device for inflating said bag in an accident situation,
knowing that:
said cushion is provided with a passage (6) allowing said bag to be deployed outside said covering,
said covering is provided with a weakened zone (7) of lesser tear resistance than the rest of said covering, said zone extending in a rectilinear reference direction (8) between two opposite parts (9a, 9b) of said covering and facing said passage,
said parts present a mesh consisting of a plurality of rows (10) of structural loops (11) arranged side by side in said reference direction, each of said loops being linked to the loops (11) surrounding it by a plurality of interweavings (12), said seat being characterized in that said zone results from the knitting of said covering and in that each of said parts is provided with a thread (17) for blocking its elongation in a direction (18) perpendicular to said reference direction, said thread:
having been knitted with said loops during the knitting of said covering,
extending in zigzags by defining a plurality of rectilinear portions (19) extending in said perpendicular direction and a plurality of portions (20) for connecting said rectilinear portions to each other, said connecting portions extending generally in said reference direction,
interweaving with said structural loops so as to be integrated into said covering.

2. Seat according to claim 1, characterized in that:
a boundary row (13a, 13b) of connecting loops (14a, 14b) results from the knitting of each of the opposite parts (9a, 9b), each of the boundary rows (13a, 13b) having, in the reference direction (8), a lower linear density of connecting loops (14a, 14b) than the structural loops (11) of either of said parts,
the weakened zone (7) is formed by the two boundary rows (13a, 13b) that interconnect through a connecting interweaving (16) of each connecting loop (14a) of one of said rows (13a) with an opposite connecting loop (14b) of the other of said rows (13b), so that the connecting loops (14a, 14b) are less interweaved than said structural loops.

3. Seat according to claim 1, characterized in that:
a boundary row (13a, 13b) of connecting loops (14a, 14b) results from the knitting of each of the opposite parts (9a, 9b),
the weakened zone (7) is formed by the boundary rows (13a, 13b) where a thread (15), resulting from the knitting of the covering (4), passes alternately into a connecting loop (14a) of one of said rows (13a) and into an opposite connecting loop (14b) of the other of said rows (13b), said thread having a breaking strength arranged so that, under the effect of deployment of the airbag (5), it breaks without causing rupture of said connecting loops.

4. Seat according to claim 1, characterized in that the rectilinear portions (19) are spaced from one another at a regular pitch, two successive rectilinear portions (19) being separated by one or more perpendicular rows (21) of structural loops (11) extending in the perpendicular direction (18).

5. Covering (4) of a seat (1) according to claim 1, said covering being provided with a weakened zone (7) of lesser resistance to tearing than the rest of said covering, said covering being characterized in that said zone results from the knitting of said covering and in that each of the parts (9a, 9b) of said covering is provided with a thread (17) for blocking its elongation in a direction (18) perpendicular to the reference direction (8), said thread:
having been knitted with said loops during the knitting of said covering,
extending in zigzags by defining a plurality of rectilinear portions (19) extending in said perpendicular direction and a plurality of portions (20) for connecting said rectilinear portions to each other, said connecting portions extending generally in said reference direction, interweaving with said structural loops so as to be integrated into said covering.

* * * * *